(12) United States Patent
Rayaprolu et al.

(10) Patent No.: US 11,720,286 B2
(45) Date of Patent: *Aug. 8, 2023

(54) EXTENDED CROSS-TEMPERATURE HANDLING IN A MEMORY SUB-SYSTEM

(71) Applicant: Micron Technology, Inc., Boise, ID (US)

(72) Inventors: Vamsi Pavan Rayaprolu, San Jose, CA (US); Sampath K. Ratnam, Boise, ID (US); Sivagnanam Parthasarathy, Carlsbad, CA (US); Mustafa N. Kaynak, San Diego, CA (US); Kishore Kumar Muchherla, Fremont, CA (US); Shane Nowell, Boise, ID (US); Peter Feeley, Boise, ID (US); Qisong Lin, El Dorado Hills, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/516,009

(22) Filed: Nov. 1, 2021

(65) Prior Publication Data

US 2022/0129204 A1      Apr. 28, 2022

Related U.S. Application Data

(63) Continuation of application No. 16/041,649, filed on Jul. 20, 2018, now Pat. No. 11,163,488.

(51) Int. Cl.
*G06F 12/00* (2006.01)
*G06F 3/06* (2006.01)

(52) U.S. Cl.
CPC .......... *G06F 3/0659* (2013.01); *G06F 3/0619* (2013.01); *G06F 3/0653* (2013.01); *G06F 3/0679* (2013.01)

(58) Field of Classification Search
CPC .... G06F 3/0659; G06F 3/0679; G06F 3/0653; G06F 3/0619; G06F 3/0647; G06F 3/0616
USPC ......................................................... 711/103
See application file for complete search history.

(56) References Cited

U.S. PATENT DOCUMENTS

| | | | |
|---|---|---|---|
| 6,646,941 B1 * | 11/2003 | Atwell | G11C 11/406 365/230.06 |
| 9,928,126 B1 * | 3/2018 | Shappir | G06F 11/1072 |
| 10,339,983 B1 | 7/2019 | Confalonieri | |
| 2016/0117216 A1 | 4/2016 | Muchherla et al. | |
| 2018/0374548 A1 | 12/2018 | Achtenberg et al. | |

* cited by examiner

*Primary Examiner* — Mardochee Chery
(74) *Attorney, Agent, or Firm* — Lowenstein Sandler LLP

(57) ABSTRACT

An indication of a programming temperature at which data is written at a first location of the memory component is received. If it is indicated that the programming temperature is outside of a temperature range associated with the memory component, the data written to the first location of the memory component is re-written to a second location of the memory component when an operating temperature of the memory component returns within the temperature range.

20 Claims, 6 Drawing Sheets

EXTENDED CROSS-TEMPERATURE HANDLING IN A MEMORY SUB-SYSTEM

RELATED APPLICATIONS

This application is a continuation application of co-pending U.S. patent application Ser. No. 16/041,649, filed Jul. 20, 2018, which is herein incorporated by reference in its entirety.

TECHNICAL FIELD

Embodiments of the disclosure relate generally to memory sub-systems, and more specifically, relate to extended cross-temperature handling in a memory sub-system.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
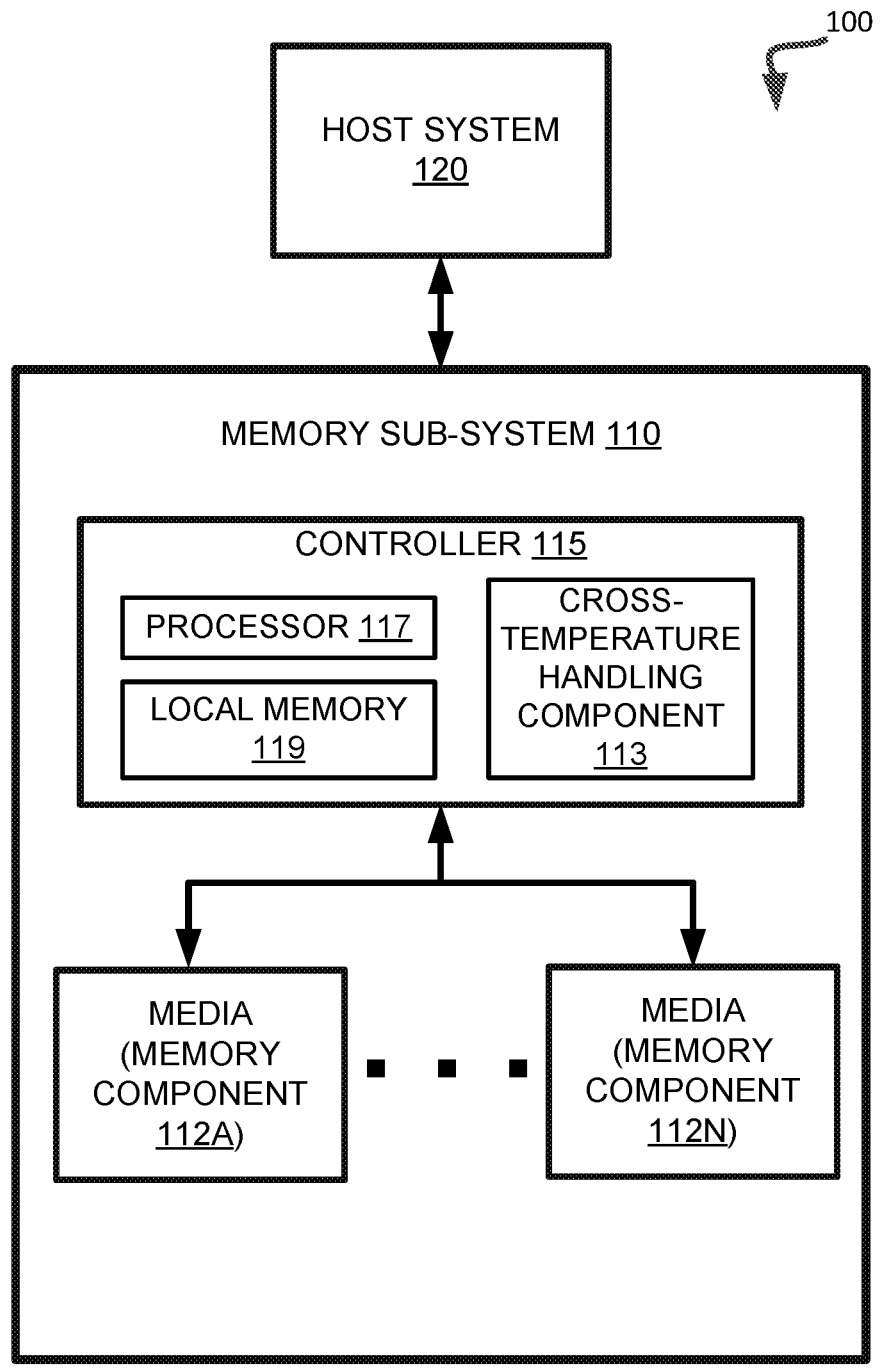
FIG. 1 illustrates an example computing environment that includes a memory sub-system in accordance with some embodiments of the present disclosure.

Aspects of the present disclosure are directed to extended cross-temperature handling of a memory sub-system. A memory sub-system is also hereinafter referred to as a "memory device". An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

The memory sub-system can include multiple memory components that can store data from the host system. Each memory component can include a different type of media. Examples of media include, but are not limited to, a cross-point array of non-volatile memory and flash based memory. Flash based memory can be of different types, such as single-level cell (SLC), multi-level cell (MLC), triple-level cell (TLC), and quad-level cell (QLC). One example of a characteristic associated with a memory component is data density. Data density corresponds to an amount of data (e.g., bits of data) that can be stored per memory cell of a memory component. Using the example of a flash based memory, a quad-level cell (QLC) can store four bits of data while a single-level cell (SLC) can store one bit of data, a MLC can store two-bits of data, and a TLC can store three bits of data. Accordingly, data density increases from SLC to MLC to TLC to QLC.

To increase data density without increasing the footprint of a memory cell, the number of array layers of the memory cell can be increased in a vertical direction. At the same time, to reduce overall size of the memory cell, advanced lithography techniques suitable for three-dimensional integration are used to keep the dimensions in each layer small. A typical side effect of the combination of increased number of layers and tighter dimensional control is data degradation through a phenomenon called bit flip, which causes higher error rates that can eventually lead to data loss.

Bit flip occurs when there is not enough separation between respective threshold voltages ($V_t$) of two consecutive bit levels (also referred to as "states"). Typically, each binary value stored in a memory cell has a different threshold voltage associated with it, with the lowest binary value having the highest threshold voltage, the highest binary value having the lowest threshold voltage, and intermediate states having progressively different threshold voltage values. For example, a TLC can have eight states, each state having a corresponding $V_t$. Similarly, a QLC can have 16 states, each state having a corresponding $V_t$. Conventionally, error caused by bit flip can be compensated through providing a better separation of levels in a threshold voltage ($V_t$) distribution. However, the separation between two consecutive levels is reduced when more bits can be stored per memory cell. For example, QLC is more susceptible to bit flip than TLC.

In a conventional memory sub-system, the level separation in threshold voltage becomes further reduced (or shifted) due to change in environmental conditions, such as cross-temperature (also known as "X-temp") effects. Cross temperature negatively impacts level separation in situations where the memory cell operates at a temperature range which is different from a temperature at which the memory cell was programmed. For example, cross temperature effects can arise when data is read from a memory cell at a temperature that is different from the temperature at which data was written into the memory cell. Cross-temperature-induced errors can be accumulated by one or both of shifted levels that cross ideal real thresholds causing bit flips and overlapping levels causing increased number of bit flips. Bit flips reduce reliability and data retention capability as a result of the increased error rate. The larger the difference between a data write temperature and a data read temperature, the larger the increase of the error rate of the data as a result of level shift and level overlap. As the storage capacity of a memory cell is increased to store more bits, meeting the reliability requirement of the memory sub-system can utilize additional error correction operations. For example, error correction codes (ECC) can be used to correct the cross-temperature related bit errors. QLC NAND-based SSDs can utilize more complex error correction operations than those using SLC, MLC or TLC NAND flash. Thus, under certain cross-temperature conditions, a large number of error correction operations will be performed to correct the cross-temperature related bit errors.

Aspects of the present disclosure address the above and other deficiencies by identifying segments in a memory sub-system (e.g., an SSD) that have data written at a temperature outside of a predefined nominal temperature range, and re-writing data written in those segments onto a new segment when the memory sub-system returns within the predefined nominal temperature range. Advantages of the present disclosure include, but are not limited to, the reduction of the performance of error correction operations. The overall performance of the memory sub-system can thus be improved as resources of the memory sub-system can be used to perform more read operations and write operations as fewer error correction operations will be performed. Additionally, this disclosure enables memory technologies with restricted temperature range operation to be utilized in applications that require operation in extreme temperature.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a NAND type flash memory. Each of the memory components 112A to 112N can include one or more arrays of memory cells such as SLCs, MLCs, TLCs or QLCs. Theoretically, higher than four levels is possible in memory cells. In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and instead relies upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a cross-temperature handling component 113 that can be used to enable the memory sub-system to handle extended cross-temperature operation by re-programming a data segment, as described in greater detail below. In some embodiments, the controller 115 includes at least a portion of the cross-temperature handling component 113. For example, the controller 115 can include a processor 117 (processing device) configured to execute instructions stored in local memory 119 for performing the operations described herein. In some embodiments, the cross-temperature handling component 113 is part of the host system 110, an application, or an operating system.

The cross-temperature handling component 113 can receive a set of markers (also called "temperature markers") covering an extended range of operating temperature. The cross-temperature handling component 113 can determine from the markers if a data segment was programmed at a temperature outside the range of a nominal operating temperature range. The cross-temperature handling component 113 can re-program data written outside of the nominal operating temperature range at a new location of the memory sub-system. The re-programming of the data from the original location to the new location reduces bit error caused by the programming temperature being outside of the nominal operating temperature range. Further details with regard to the operations of the cross-temperature handling component 113 are described below.

Figure 2:
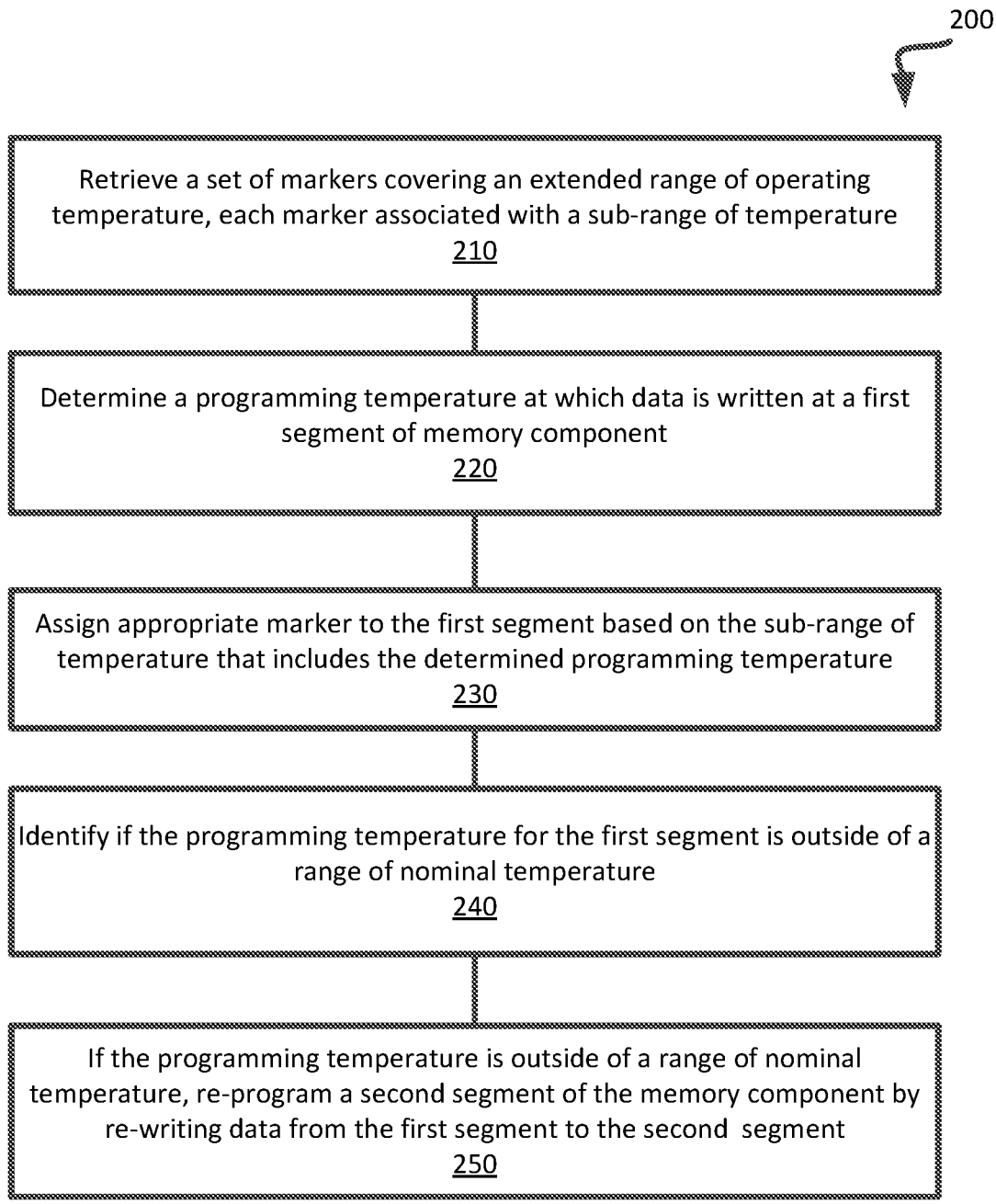
FIG. 2 is a flow diagram of an example method to counter possible bit error in stored data due to writing the data outside of normal operating temperature range of the memory sub-system, in accordance with some embodiments of the present disclosure.

FIG. 2 is a flow diagram of an example method 200 to enable a memory component to handle extended cross-temperature operation, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the cross-temperature handling component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 210, the cross-temperature handling component 113 retrieves a set of markers that covers an extended range of operating temperature for a memory component. Each marker is associated with a sub-range of temperature within the extended range of operating temperature. The memory component has a number of segments. At block 220, the cross-temperature handling component 113 determines a programming temperature at which data is written at a first segment of the memory component. At block 230, the cross-temperature handling component 113 assigns an appropriate marker to the first segment. The appropriate marker is associated with the sub-range of temperature that includes the determined programming temperature. At block 240, the cross-temperature handling component 113 identifies if the programming temperature for the first segment of the memory component is outside of a range of nominal temperature. The "nominal temperature" is defined as an operating temperature at which cross-temperature-induced bit error rate is within an acceptable range and risk of data loss is minimal. If the programming temperature is outside of the range of nominal temperature, the cross-temperature handling component 113 re-programs a second segment of the memory component by re-writing data from the first segment to the second segment at block 250. As described with respect to FIG. 4, the re-programming occurs when certain conditions are met, for example when the memory component returns to the nominal temperature range, and/or when the memory component is idle.

Figure 3A:
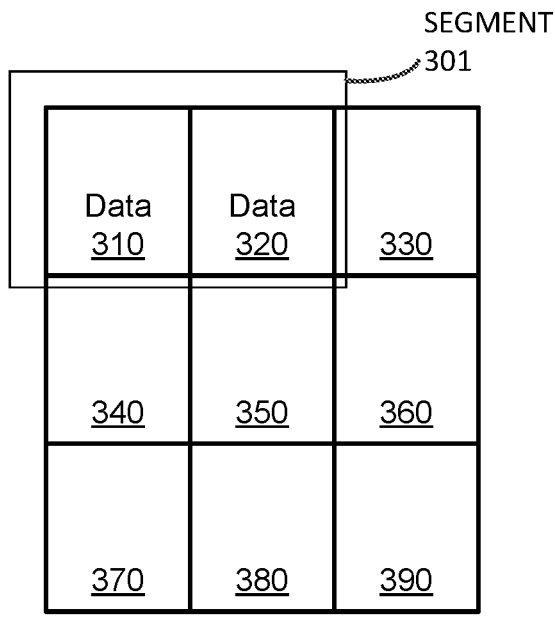
FIG. 3A illustrates data written in a segment of the memory component at a programming temperature, in accordance with some embodiments of the present disclosure.

FIG. 3A schematically shows a portion of a memory component that includes a number of multiple-bit memory cells 310, 320, 330, 340, 350, 360, 370, 380, and 390. Though nine memory cells are shown in this illustrative example, the disclosure is not limited to a specific number of memory cells. The memory cells can be QLCs, though other types of memory cells can be used. A segment of the memory component can include one or more memory cells. For example, in the example shown in FIG. 3A, a segment 301 includes two memory cells 310 and 320. Data is written to the cells 310 and 320 at a programming temperature that is outside of a predefined nominal temperature range of the memory component. For example, a nominal temperature range can be 25-45° C., though other nominal ranges are within the scope of the disclosure. The programming temperature can be outside of the nominal range. For example, the data can be written to the cells 310 and 320 when a memory component that includes the cells 310 and 320 is at an operating temperature that is outside of the nominal temperature range. Depending on the application, the programming temperature can be anywhere between −40° C. to 105° C., though the scope of the disclosure is not limited by the programming temperature range.

Figure 3B:
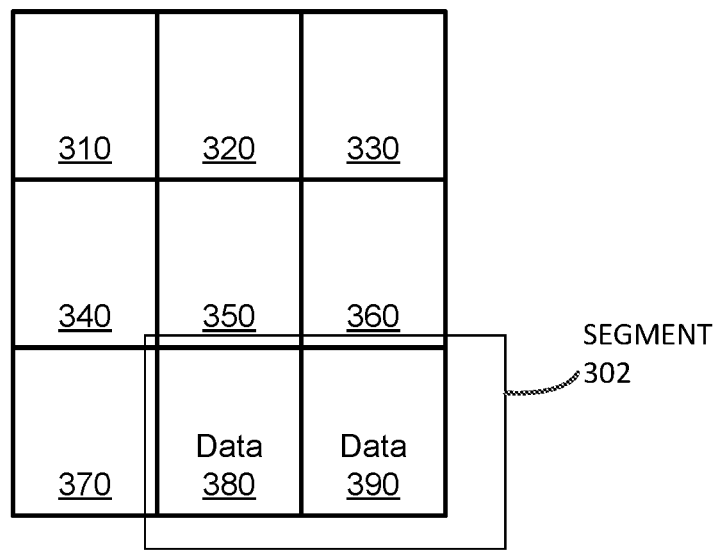
FIG. 3B data re-written in a different segment of the memory component at a nominal temperature, in accordance with some embodiments of the present disclosure.

FIG. 3B schematically shows that the data originally programmed at segment 301 can be re-programmed into a new segment 302 that includes memory cells 380 and 390. The cross-temperature handling component 113 of FIG. 1 performs the re-programming of the data when the memory component returns to operate within the nominal temperature range. Since the re-programming is performed at a nominal temperature, the re-programmed data is largely free from bit error caused by the extreme temperature during original programming of segment 301.

Figure 4:
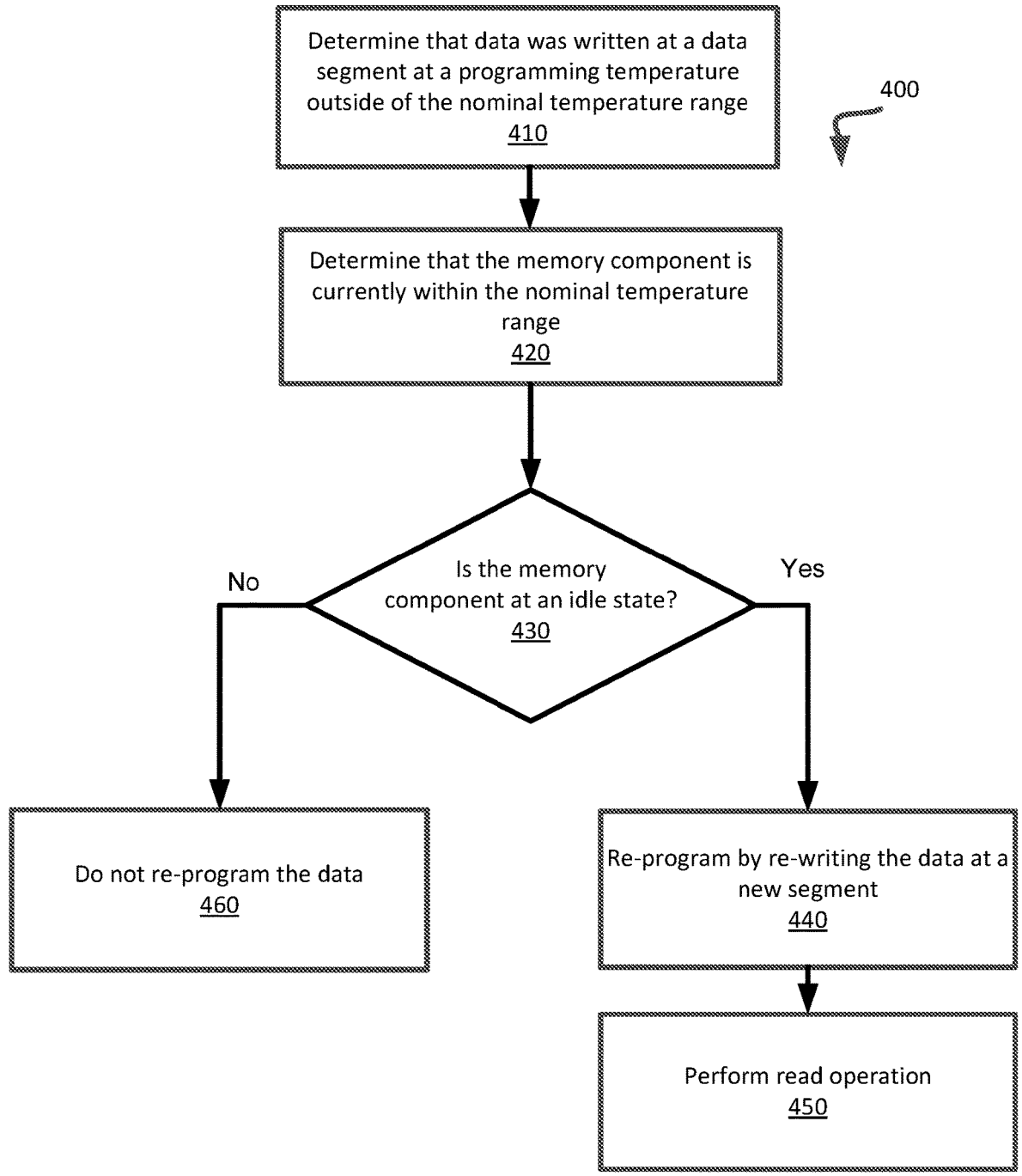
FIG. 4 is a flow diagram of an example method to re-program data at a memory component of a memory sub-system when certain conditions are met in accordance with some embodiments of the present disclosure.

FIG. 4 is a flow diagram of an example method 400 to determine whether to re-program data from a first segment of a memory component to a new segment. In general, the method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the cross-temperature handling component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 410, the cross-temperature handling component 113 determines that data was written at a data segment at a programming temperature outside of the nominal temperature range. At block 420, the cross-temperature handling component 113 determines that the memory component is currently within the nominal temperature range. At the decision block 430, cross-temperature handling component 113 determines if the memory component is in an idle state (i.e., additional data is not being programmed to the memory component). If the memory component is not currently idle, then no re-programming is performed, as shown in block 460. If the memory component is currently idle, then, at block 440, the cross-temperature handling component 113 re-programs the memory component by re-writing data from the original segment (such as segment 301 in FIG. 3A) to a new segment (such as segment 302 in FIG. 3B). Re-programming can be done at a varying granularity level, for example, page level, multi-page level, codeword level, block level, or a super-block level.

The granularity at which the data is re-programmed is a strong function of the amount of additional volatile or non-volatile memory resources the system is willing to sacrifice to store the temperature markers. As an example, super-blocks are typically the largest memory structures in the system. This implies that the amount of temperature markers stored at the super-block level would be smallest amount of memory resource sacrificed. The down-side to using markers at a super-block level is that entire super-blocks need to be re-programmed during nominal operation, which can strain system operational resources as a large amount of effort is applied to re-program the super-block. On the other end of the spectrum, a page is the smallest granularity level at which store temperature markers can be stored. Using page-level granularity would utilize a large amount of memory resource but would reduce the amount of data that is required to be re-programmed during nominal temperature operation. This trade-off is determined by the system specification, excess memory availability and the amount of resource that can be sacrificed during nominal temperatures for re-programming operations.

Optionally, a read operation is performed at block 450 to read the re-programmed data instead of the originally programmed data which was written in the first segment at a programming temperature outside of the nominal temperature as the originally written data is prone to cross temperature-induced bit error. For example, when a read operation for the data is received from a host system, the re-programmed data at the new data segment can be returned to the host system instead of the data that was written to the first segment. In some embodiments, after the data is re-programmed to the new segment, the data at the first segment can be erased. Re-programming at the nominal temperature reduces the need to incorporate additional error correction code before reading the data, even when the data is read at a temperature outside of the nominal temperature range.

Figure 5:
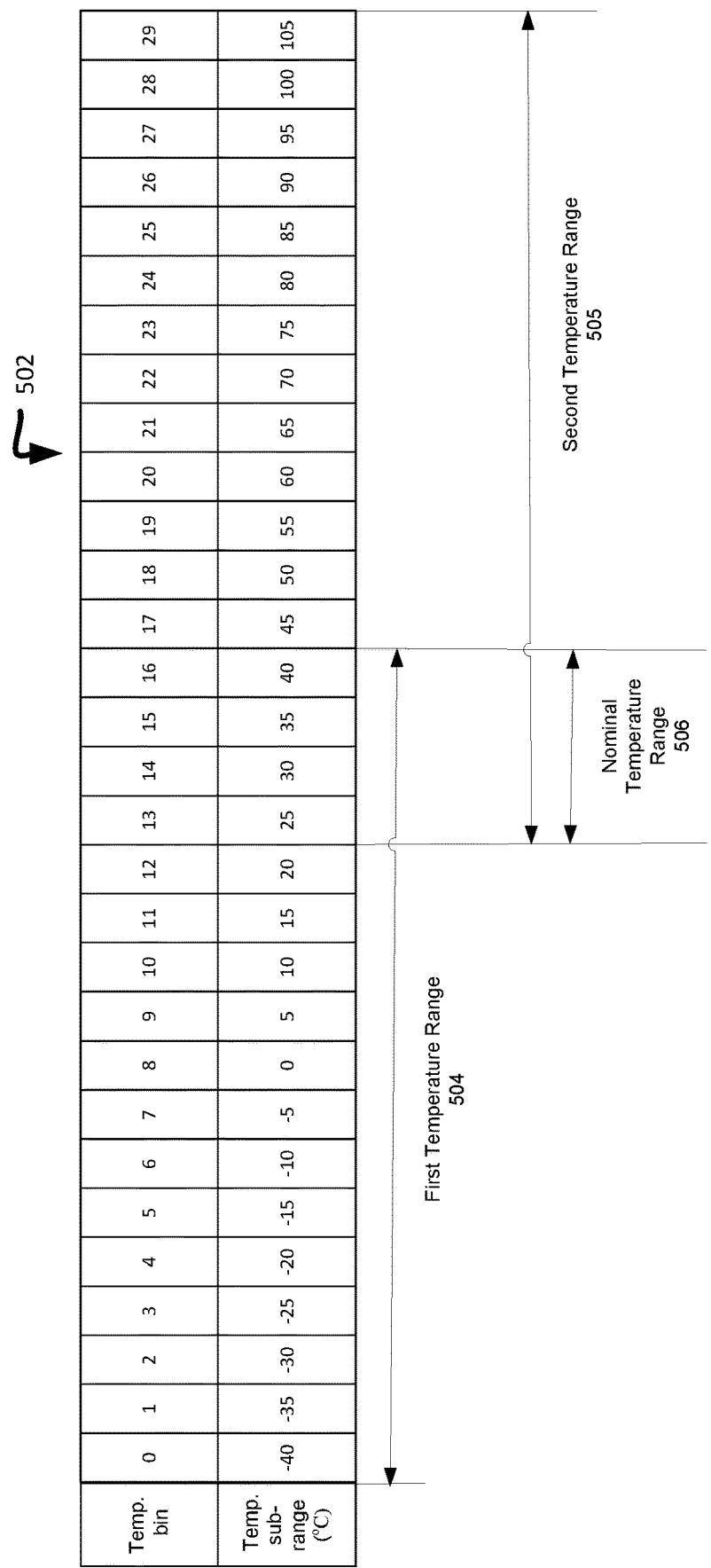
FIG. 5 shows the use of temperature markers for determining that data was written at a programming temperature outside of a predefined nominal temperature range, in accordance with some embodiments of the present disclosure.

FIG. 5 shows the mechanism of determining that data was written at a programming temperature outside of a pre-defined nominal temperature range. Markers or identifiers are used to identify the data segments and corresponding memory locations which were programmed at a temperature outside of the nominal temperature range. In the example shown in FIG. 5, a non-limiting nominal temperature range is shown to be 25° C. to 45° C., and a non-limiting extended cross-temperature range is shown to be −40° C. to 105° C. As previously described, cross-temperature is the delta between two operations, such as writing data and reading data. In FIG. 5, a first temperature range (shown as 504) represents a write temperature range spanning from −40° C. to 45° C., and a second temperature range (shown as 505) represents a read temperature range spanning from 25° C. to 105° C. In the worst cross-temperature scenario, a write operation is performed at an extreme end of the write temperature range while read operation is performed at the other extreme end of the read temperature range. The present disclosure reduces the delta between read and write operations by re-writing data when the memory component is at a nominal temperature range (shown as 506). Due to re-writing, the memory cells can experience a reduced effective cross-temperature range. Reducing the effective cross-temperature relaxes the need for additional error correction that would otherwise have been needed under extended cross-temperature conditions. The reduced effective cross-temperature range can be 50% (or even lower percentage) of the extended cross-temperature range.

As shown in FIG. 5, the entire cross-temperature range −40° C. to 105° C. is divided into sub-ranges of temperature. Each sub-range can be predefined, such as 5° C., as shown in the example of FIG. 5. Each sub-range has an associated marker. The markers are quantized bins that represent a corresponding temperature sub-range. For example, the marker '0' represents the sub-range −40° C. to −35° C., the marker '1' represents the sub-range −35° C. to −30° C., and so forth, all the way up to the marker '29' representing the sub-range 100° C. to 105° C. The marker values can be stored as a data structure (e.g., table 502) at a location that is external to the memory component. An example of an external location can be read-only non-volatile memory associated with a firmware. Another example of an external location is a more reliable volatile or non-volatile memory in the local memory 119 of the controller, as shown in FIG. 1. The marker values are inspected to determine whether data in a segment was originally written at a temperature outside of a nominal temperature range, and therefore needs to be re-written at a new segment when the memory component returns to a nominal temperature, in accordance with the method 400 of FIG. 4. Though not shown in FIG. 4, a priority scheme can be deployed to re-write the data programmed at the most extreme temperature bins, walking inwards towards data programmed closer to the nominal temperature range. It is possible that when the nominal temperature range is reached, there are several memory segments (e.g., pages, blocks, super-blocks etc.) that require re-programming. The priority scheme helps the system prioritize the various memory segment locations based on their temperature markers. The memory segments that have markers further away from the nominal temperature range marker(s) are at a higher risk of bit errors or reliability concerns. Those segments are prioritized compared to the segments tagged with the markers closer to the nominal temperature range. For example, in FIG. 5, if the system is currently in temperature bin 13 (25° C. to 30° C.), re-programming is prioritized for all segments in temperature bin 29 first as those segments are the farthest away from the nominal temperature range. Then segments in bin 28 are re-programmed, followed by segments in bin 27, followed by segments in bin 0, followed by segments in bin 26. Followed by segments in bin 1, followed by segments in bin 25 and so on. It is to be noticed that segments are chosen from both ends of the temperature spectrum. Essentially, re-programming starts from the segments at the farthest end of the temperature spectrum and propagates inwards to determine the order of re-programming.

Figure 6:
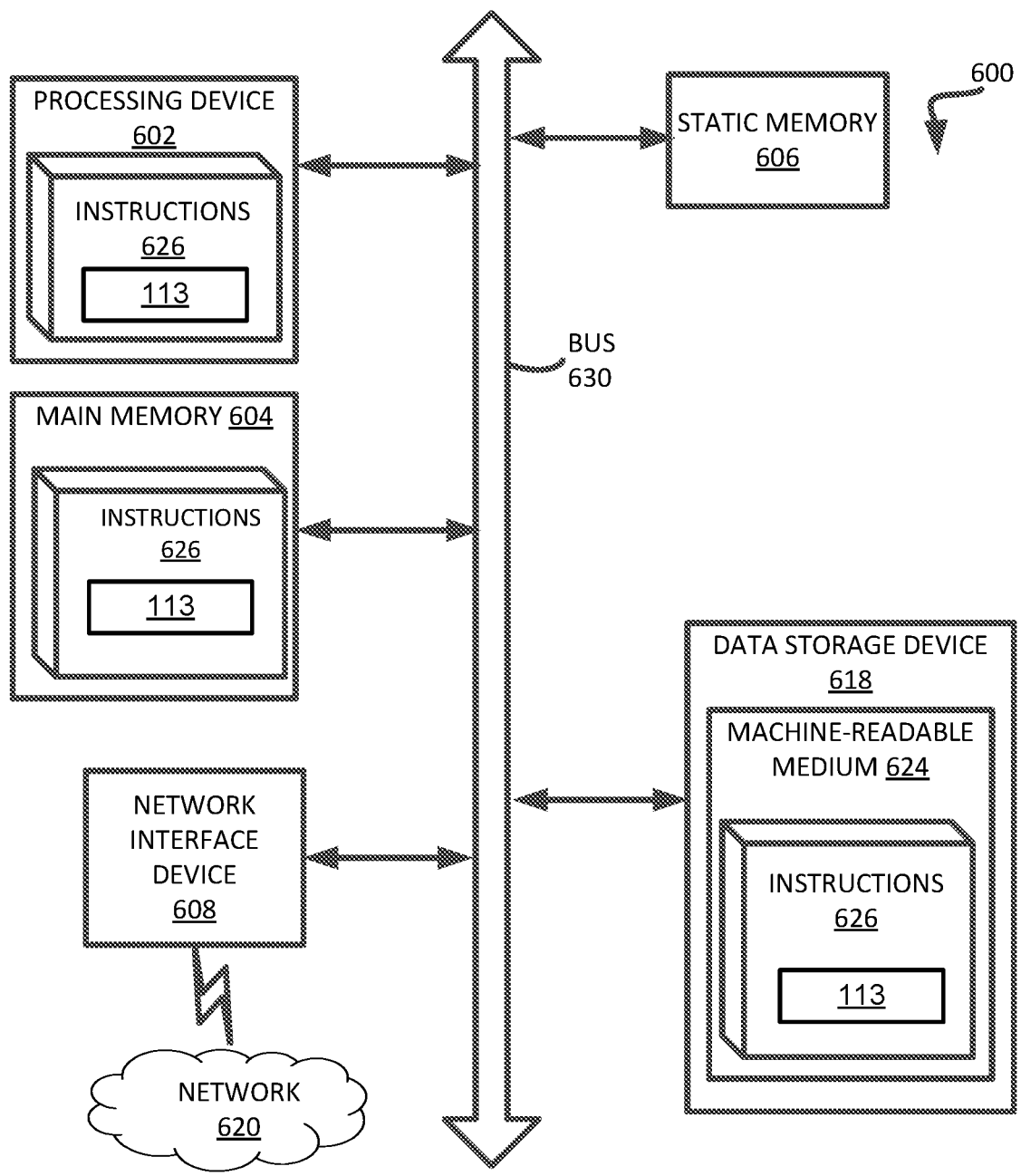
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the cross-temperature handling component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a cross-temperature handling component (e.g., the cross-temperature handling component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device configured to operate in a temperature range that spans beyond a nominal temperature range; and
   a processing device, operatively coupled with the memory device, to perform operations comprising:
      determining, from a temperature marker, a programming temperature at which data is originally written in the memory device; and
      in response to determining that the data is originally written at the programming temperature that is outside of the nominal temperature range, re-writing the data in the memory device when an operating temperature of the memory device is within the nominal temperature range.

2. The system of claim 1, wherein the processing device further performs operations comprising:
   retrieving a plurality of temperature markers covering the temperature range that spans beyond the nominal temperature range, each temperature marker of the plurality of temperature markers being associated with a sub-range of temperature within the temperature range.

3. The system of claim 2, wherein the processing device further performs operations comprising:
   associating an appropriate temperature marker from the plurality of temperature markers to a first segment of the memory device where the data is originally written.

4. The system of claim 3, wherein in response to determining that the data is originally written at a programming temperature that is outside of the nominal temperature range, the processing device further performs operations comprising:
   re-writing the data at a second segment of the memory device different from the first segment of the memory device where the data is originally written.

5. The system of claim 1, wherein the processing device further performs operations comprising:
   monitoring a temperature of the memory device in order to determine when the operating temperature of the memory device is within the nominal temperature range for re-writing the data.

6. The system of claim 1, wherein the processing device further performs operations comprising:
   determining whether the system is in an idle state; and
   in response to determining that the system is in the idle state, re-writing the data in the memory device when the operating temperature of the memory device is within the nominal temperature range.

7. The system of claim 1, wherein the processing device further performs operations comprising:
   determining an amount of unused memory resource in the memory device to store the temperature marker; and
   determining a granularity level of re-writing the data based on the amount of unused memory resources.

8. The system of claim 7, wherein the granularity level is chosen from at least one of a page level, multiple page level, codeword level, block level, or super-block level.

9. The system of claim 1, wherein the processing device further performs operations comprising:
   determining a first amount by which a first programming temperature of a first piece of data deviates from the nominal temperature;
   determining a second amount by which a second programming temperature of a second piece of data deviates from the nominal temperature; and
   using a predetermined priority scheme to determine an order of re-writing the first piece of data and the second piece of data based on comparing the first amount and the second amount.

10. A method comprising:
    determining, by a processing device, from a first temperature marker, a programming temperature at which data is written at a first segment of a memory device;
    in response to determining that the data is originally written at the first segment at the programming temperature that is outside of the nominal temperature range, re-writing the data at a second segment of the memory device when an operating temperature of the memory device is within the nominal temperature range; and
    associating, by the processing device, a second temperature marker to re-written data at the second segment, wherein the second temperature marker indicates the nominal temperature range.

11. The method of claim 10, further comprising:
    receiving a read request from a host system for the data originally written at the first segment; and
    based on the second temperature marker, returning the re-written data from the second segment to the host system.

12. The method of claim 10, further comprising:
    prior to re-writing the data at the second segment, determining that the memory device is currently at an idle state.

13. The method of claim 10, further comprising:
monitoring a temperature of the memory device in order to determine when the operating temperature of the memory device is within the nominal temperature range for re-writing the data.

14. A method comprising:
determining, by a processing device, from a temperature marker, a programming temperature at which data is originally written in a memory device configured to operate in a temperature range that spans beyond a nominal temperature range; and
in response to determining that the data is originally written at the programming temperature that is outside of the nominal temperature range, re-writing the data in the memory device when an operating temperature of the memory device is within the nominal temperature range.

15. The method of claim 14, further comprising:
retrieving a plurality of temperature markers covering the temperature range that spans beyond the nominal temperature range, each temperature marker of the plurality of temperature marker being associated with a sub-range of temperature within the temperature range.

16. The method of claim 15, further comprising:
associating an appropriate temperature marker from the plurality of temperature markers to a first segment of the memory device where the data is originally written.

17. The method of claim 16, wherein in response to determining that the data is originally written at a programming temperature that is outside of the nominal temperature range, the method further comprises:
re-writing the data at a second segment of the memory device different from the first segment of the memory device where the data is originally written.

18. The method of claim 14, further comprising:
monitoring a temperature of the memory device in order to determine when the operating temperature of the memory device is within the nominal temperature range for re-writing the data.

19. The method of claim 14, further comprising:
determining whether the system is in an idle state; and
in response to determining that the system is in the idle state, re-writing the data in the memory device when the operating temperature of the memory device is within the nominal temperature range.

20. The method of claim 14, further comprising:
determining an amount of unused memory resource in the memory device to store the temperature marker; and
determining a granularity level of re-writing the data based on the amount of unused memory resources.

* * * * *